Patented May 12, 1953

2,638,483

UNITED STATES PATENT OFFICE 2,638,483

CRYSTALLINE β-IONONE

Thomas G. Drustrup, Groton, Conn., assignor to Chas. Pfizer & Co., Inc., Brooklyn, N. Y., a corporation of Delaware No Drawing. Application February 14, 1951, Serial No. 210,985

4 Claims. (Cl. 260—586)

This invention relates to the purification of an essential intermediate in the synthesis of vitamin A, β-ionone, whereby the subsequent quality and yield of vitamin A may be improved.

Beta-ionone [4-(2,6,6-trimethyl-1-cyclohexenyl)-3-buten-2-one] is used as starting material for the industrial synthesis of vitamin A. Haloacetic esters and β-ionone are usually reacted together, the resulting compound hydrolyzed and decarboxylated to form a $C_{14}$ aldehyde, and the aldehyde converted to the vitamin. In this and similar methods for vitamin A preparation, it is vital to purify the various intermediates, and particularly the β-ionone, in order to recover finally a pure vitamin A product. Unfortunately, the most feasible process for initially obtaining the β-ionone, acid cyclization of pseudo-ionone, yields a product having as low as only 70% β-ionone content and contaminated with the unreacted pseudo compound and with α-ionone and like isomers. Considerable difficulty has heretofore been encountered in purifying this product. Prolonged heating, as is necessary with the usual fractional distillation method, causes degradation and polymerization of the β-ionone. The pseudo-ionone, α-ionone and the like, being of related structure, are difficult to separate; but if they are allowed to remain in the product during synthesis of vitamin A, the quality of the finally recovered vitamins will be considerably lowered, due to the various undesired and biologically inactive products which will be formed from these contaminants.

A simple method has been found whereby it is possible considerably to improve the purity of β-ionone contaminated by materials, such as pseudo-ionone and α-ionone, which are recovered with the β-ionone from the acid cyclization process. This method broadly comprises dissolving the cyclization product in an organic solvent, lowering the temperature of the solution to at least about −35° C., and selectively crystallizing β-ionone from the solution. Apparently β-ionone has never heretofore been crystallized, and the crystalline product of this process is a novel composition. Assuredly one would not have predicted that, in the presence of contaminants having isomeric structures, the impure oil would selectively yield crystals of β-ionone of notably increased purity. However, unexpectedly and most favorably, crude β-ionone prepared by the conventional acid isomerization of pseudo-ionone, when dissolved in certain solvents and subjected to low temperatures, forms crystals of purified β-ionone in good yield. This material is, of course, much more suitable as a starting reactant for the synthesis of vitamin A than is the crude product of the cyclization, or the distilled cyclization product. The necessity for having highly purified starting material in the vitamin A synthesis cannot be over-emphasized. Since the synthesis involves a considerable number of steps, each reactive contaminant in the starting material will form a new group of contaminants at each successive step of the process. The result is a vitamin A product containing a variety of undesirable impurities which are separated only with great difficulty.

In a specific embodiment of this process crude β-ionone, having a β-ionone content as low as 70% and contaminated with pseudo-ionone and isomers of β-ionone, is dissolved in a small volume of organic solvent. The mixture is cooled to a temperature of at least about −35° C. and preferably substantially between −50° and −75° C., and is stirred at this temperature until selective crystallization of β-ionone is complete. The formation of crystals may be accelerated by the addition of seed crystals. This is not essential for the process but may be used to save time. Generally crystallization is effected in from 1 to 20 hours, depending on the conditions of temperature, seeding, solvent and the like.

A number of different solvents may be used in this process, including aliphatic or cycloaliphatic hydrocarbons, such as pentane, hexane, low boiling (20° to 100° C.) petroleum fractions, and methylcyclohexane; lower alkanols (having from one to about four carbon atoms) like methanol, ethanol, and isopropanol; lower alkanones such as acetone and methylethyl ketone; and lower alkyl ethers like diethyl ether. Mixtures of these may also be employed. The chosen solvent or mixture of solvents must, of course, not have a melting point such that it will interfere in the process by crystallizing itself. The solubility of crude β-ionone naturally varies somewhat in different liquids, but in general at least about one milliliter of solvent is used per gram of the crude ionone.

The β-ionone content of the crude cyclization products and of the crystalline products of this process may be determined by the usual spectrophotometric methods, since β-ionone has a characteristic maximum in its ultraviolet absorption spectrum at 295 m$\mu$. The total ketone contents may be determined by oxime formation. The new low-temperature selective crystallization commonly results in β-ionone of 92% or better purity and in a yield of at least 70% thereof. It is preferable to use crude starting material containing at least about 70% β-ionone. In some cases where a particularly poor cyclization product must be treated, one or more recrystallizations may serve further to improve the quality. In general, β-ionone of at least about 92% purity is desirable for use in the subsequent vitamin A synthesis.

A further advantage of this process is that the entire purification of β-ionone may be carried out in only one vessel, without removal and transfer of the contents. This, of course, means a saving in equipment as compared, for instance, to the equipment that must be used for purifying β-ionone by fractional distillation. The apparatus required for such a distillation is expensive and necessitates skilled operation in order that an improved product may be obtained. Even the most painstaking fractional distillation cannot be depended upon to yield a product of such high purity as is obtained by the present invention.

The following examples are given merely to demonstrate the value of this invention and are not to be considered as the only manner in which the process may be conducted.

Example I

Crude β-ionone (436 grams), having a β-ionone content of 81% as determined by spectrophotometric analysis, containing a total of 94.5% of ketones and having a refractive index of $n_D^{20}=1.5178$, was added to 800 milliliters of a commercially available, low boiling (28–38° C.) petroleum fraction known in the trade as Skellysolve A. The mixture was stirred in a glass flask and cooled in a Dry Ice-acetone bath to a temperature of about −70° C. in a period of approximately 30 minutes. Seeds of β-ionone, which were obtained from a previous batch in the same manner, were added from a Dry Ice-cooled tube. The mixture was stirred for 5 hours to complete crystallization and then stored overnight at −70° C. A glass tube having a frittered glass disk at its lower end was inserted into the liquid. The upper end of the tube was attached to a flask equipped for evacuation, and the latter was subjected to a vacuum, drawing the liquid from the crystallization vessel. After as much of the mother liquor had been thus withdrawn as was possible, 500 milliliters of Skellysolve A, which had been precooled to −70° C. was added to the flask. The crystals were stirred with the fresh solvent for a short time and this wash liquid was withdrawn in the same manner as previously. The crystalline β-ionone was then allowed to melt (at about −35° C.) by removing the flask from the cooling bath. After the mixture had reached room temperature, vacuum was applied so that the remaining traces of solvent were evaporated off. The residual material consisted of a pale yellow oil, weighing 316 grams and assaying 96% pure β-ionone by the spectrophotometric method. The refractive index of this product was $n_D^{20}=1.5193$. Of the original β-ionone content of the crude material, 86% was recovered as purified product.

It was found that this material was particularly suitable for condensation with ethyl chloroacetate in the next step of the vitamin A synthesis. However, when the crude β-ionone starting material was utilized for condensation with ethyl chloroacetate, a low yield of very poor quality "C14 aldehyde" was obtained.

Example II

Ninety-three grams of β-ionone assaying 92.5% pure were dissolved in 100 milliliters of the Skellysolve A type of solvent. The solution was cooled with stirring to about −60° C. and held at that temperature for several hours. As in the previous example, the mother liquor was separated from the crystallized β-ionone by vacuum and a further 60 milliliter portion of Skellysolve A, precooled to about −60° C., was added. The resulting suspension of crystals was stirred for a short time, and the solvent was withdrawn leaving the purified, crystalline β-ionone. This product weighed 83 grams and, when assayed by the spectrophotometric method, was found to have a β-ionone content of 96.5%. Thus, a 93% recovery of the desired material was attained.

Example III

One hundred grams crude β-ionone, obtained by acid cyclization of pseudo-ionone and assaying 72% pure, were dissolved in 200 milliliters of Skellysolve A, and the mixture was cooled to about −70° C. Seeds of crystalline β-ionone previously stored at a low temperature were added to the cooled mixture. After stirring for several hours, the mother liquor was removed by suction and the residual crystals were washed with 100 milliliters of precooled Skellysolve A. After removal of this wash and traces of residual solvent, the product was weighed. A total of 71 grams of crystalline β-ionone assaying 88% pure was recovered. This material could be recrystallized by the same method to raise its potency to a level suitable for use in the synthesis of vitamin A.

Example IV

To 200 milliliters of methanol in a one liter round bottom flask were added 100 grams of crude β-ionone assaying about 92% and with a refractive index of $n_D^{20}=1.5191$. The mixture was cooled to about −70° C. and stirred for several hours. After removing the supernatant liquid from the crystalline precipitate by suction, 200 milliliters of precooled methanol were added. The mixture was stirred for a short time and the wash liquid removed. A second 200 milliliter portion of precooled methanol was used to wash the crystals again. After this had been removed the crystals were allowed to melt and traces of methanol were removed by evacuating the flask. The product obtained weighed 71 grams. It was a light yellow oil assaying 97% β-ionone and having a refractive index of $n_D^{20}=1.5204$.

Example V

A one-gram sample of crude β-ionone assaying about 85% and contaminated with α-ionone isomer and pseudo-ionone was placed in a test tube. To this oil were added two milliliters of ethanol. The test tube was stoppered and the mixture cooled in a Dry Ice bath. The test tube was shaken and occasionally the stopper was removed to stir the mixture with a glass rod. Crystals of β-ionone soon separated. The solvent was removed by suction and the crystals were washed with two milliliters of precooled solvent. After the wash had been removed, the contents of the tube were allowed to warm to room temperature and vacuum was applied. After traces of the solvent had been thus withdrawn, the product was assayed and found to contain about 95% of β-ionone.

The above procedure was repeated with samples of the same batch of β-ionone using as solvent and wash liquid isopropanol, acetone and diethyl ether. In each case, crystalline β-ionone was formed and found to have been improved appreciably in purity.

As many apparently widely different embodiments of this invention may be made without departing from the spirit and scope thereof, it is to be understood that the above invention is not limited, except as defined in the appended claims.

What is claimed is:

1. A process for the purification of β-ionone contaminated with pseudo-ionone and α-ionone, which comprises dissolving the crude β-ionone in an organic solvent, lowering the temperature of the solution to at least about −35° C., and recovering the β-ionone crystals so produced.

2. A process for preparing β-ionone particularly suitable for use in the synthesis of vitamin A, which comprises dissolving the product obtained by acid cyclization of pseudo-ionone in an organic solvent, lowering the temperature of the solution to substantially between −50° and −75° C., and recovering the crystalline β-ionone thereby produced.

3. A process according to claim 1 in which the organic solvent is a member selected from the group consisting of aliphatic and cycloaliphatic hydrocarbons, lower alkanols, lower alkanones, and lower alkyl ethers.

4. A process according to claim 1 wherein the organic solvent is a petroleum fraction boiling at substantially between 28 and 38° C.

THOMAS G. DRUSTRUP.

No references cited.